Nov. 28, 1961    C. E. STRESNAK ET AL    3,010,714
OVERLOAD SPRING MOUNT FOR SHOCK ABSORBERS
Filed April 18, 1960    2 Sheets-Sheet 1
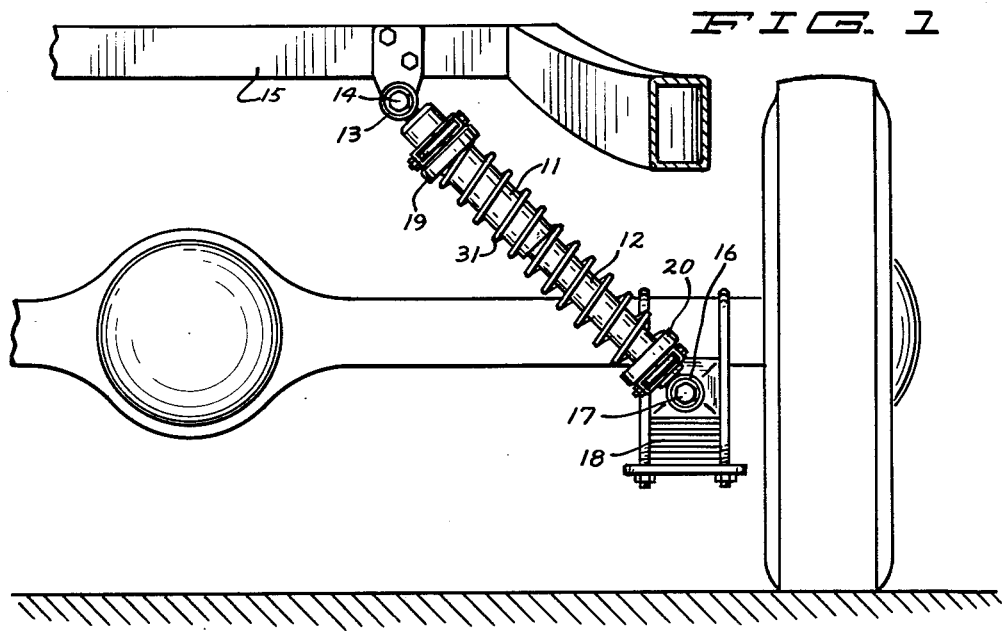
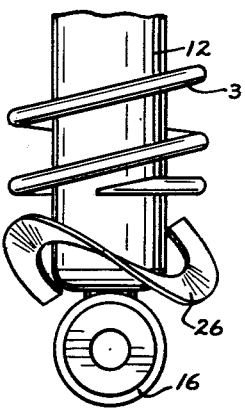
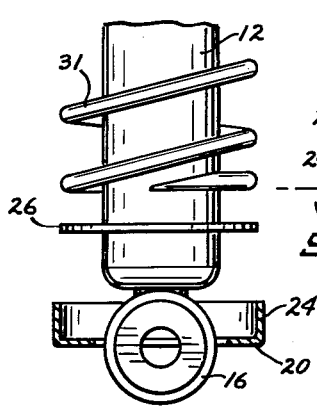
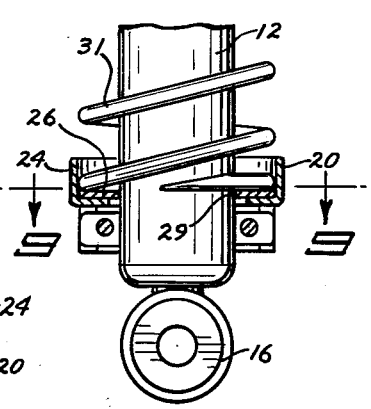
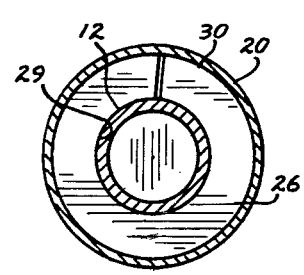
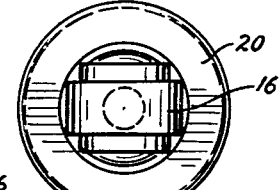
INVENTOR.
CLARENCE E. STRESNAK
NATHAN B. OWEN
BY Braddock and Braddock
ATTORNEYS

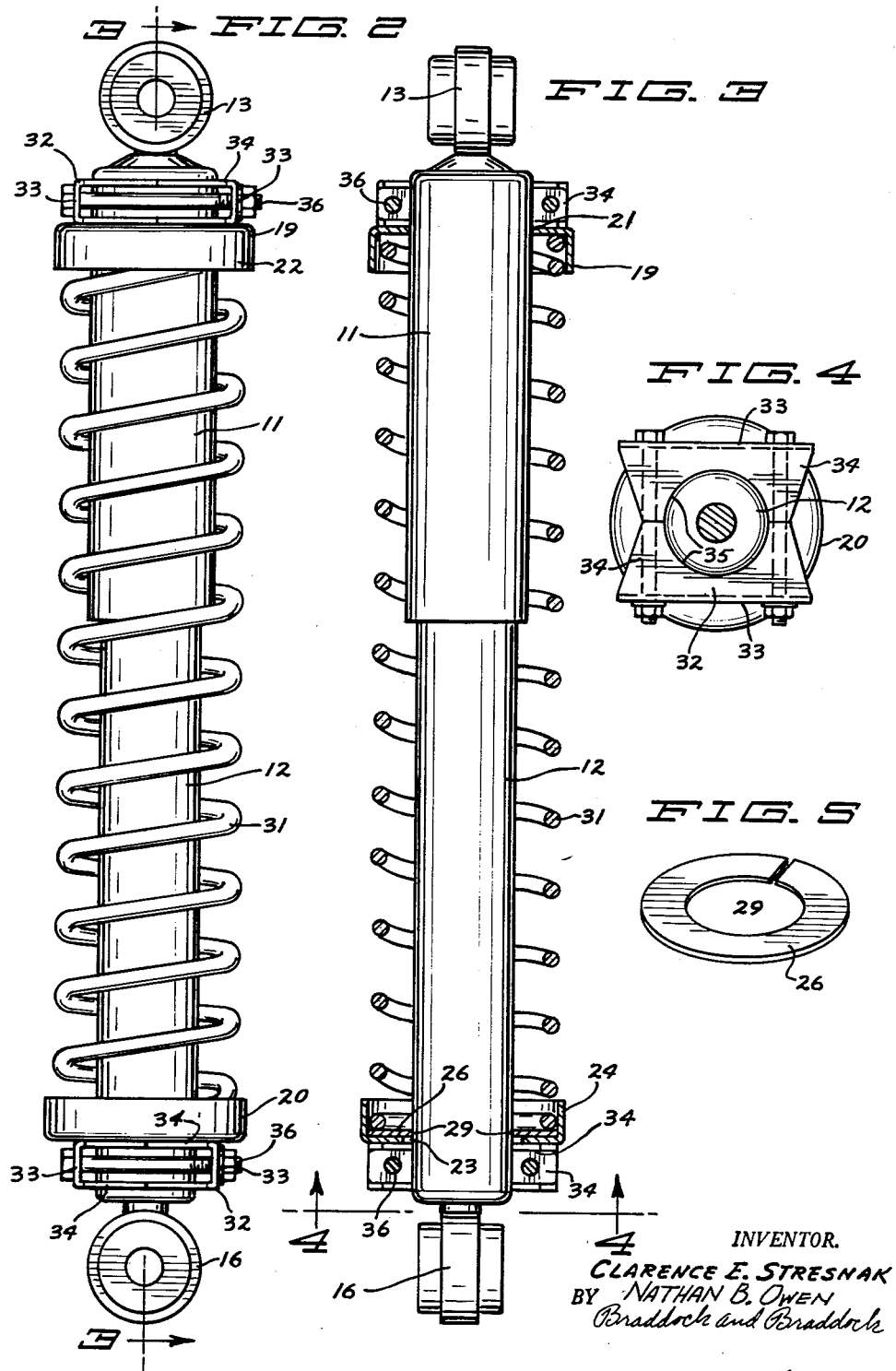

3,010,714
**OVERLOAD SPRING MOUNT FOR
SHOCK ABSORBERS**
Clarence E. Stresnak, 13529 Bellvue Drive, Hopkins,
Minn., and Nathan B. Owen, 5725 Upton Ave. S.,
Minneapolis 10, Minn.
Filed Apr. 18, 1960, Ser. No. 22,727
1 Claim. (Cl. 267—8)

The invention herein has relation to a new and improved overload spring mount to be applied to shock absorbers consisting of or including telescoping members.

In the accompanying drawings forming a part of this specification,

FIG. 1 is a side elevational view of an overload spring mount made according to the invention as when put to one of various uses for which the spring mount is capable of employment;

FIG. 2 is an enlarged side elevational view of said overload spring mount;

FIG. 3 is a longitudinal sectional view, taken on line 3—3 in FIG. 2;

FIG. 4 is a detail sectional view, taken as on line 4—4 in FIG. 3;

FIG. 5 is a perspective view of a type of deformable split washer suitable for use in the overload spring mount;

FIGS. 6, 7 and 8 are fragmentary side elevational views, FIGS. 7 and 8 being partially in section, illustrative of the manner of assembly of parts of said overload spring mount;

FIG. 7A is an end view of the disclosure of FIG. 7 as it would appear from below; and FIG. 9 is a detail sectional view, taken as on line 9—9 in FIG. 8.

In FIG. 1 of the drawings there is disclosed a shock absorber including a first or upper body member 11, also known as a rock guard, and a second or lower body member 12, commonly referred to as a main shock absorber body, telescopically received in said first or upper body member or rock guard. A mounting means, constituted as a ring end 13 rigid and alined with the first or upper body member 11 as shown, is secured, as at 14, to a frame 15 of a vehicle and a mounting means, constituted as a ring end 16 rigid and alined with the second or lower body member 12, is secured, as at 17, to a main spring 18 of said vehicle. Each of the ring ends 13 and 16 supports an adapter of usual type and the adapters have holes for receiving mounting bolts for the shock absorber. Structure as just described, including ring ends or other mounting means, is old in the art and as such forms no part of the present invention. Attention is called to the fact, however, that the ring ends 13 and 16 are of larger diameter than is the second or lower body member 12, which is customarily so in the instance of shock absorbers as now of commerce.

When shock absorbers are to be equipped with overload spring mounts incorporating features and characteristics of the invention they will be removed from their respective vehicles and replaced after being equipped in the same manner as they would have been had the spring mounts not been applied. Stated differently, overload spring mounts made according to the invention are to be independent of and separate from mounting means for shock absorbers on which the overload spring mounts are supported.

The new and improved overload spring mount includes first and second cup shape elements 19 and 20.

The first cup shape element 19 is constituted as a flat base having an opening 21 therethrough, of diameter to be slid over one of the ring ends and snugly slidably fitted around the upper, larger first body member 11 of the shock absorber, and a downwardly extending annular flange 22, integral with the exterior margin of said flat base, to lie in spaced, concentric relation to said first or upper body member.

The second cup shape element 20 is constituted as a flat base having an opening 23 therethrough, of diameter sufficiently large to be slid over one of the ring ends and greater than that of the lower, smaller second body member 12 of the shock absorber, and an upwardly extending annular flange 24, integral with the exterior margin of said flat base, to lie in spaced, concentric relation to said second or lower body member.

A flat washer 26 is seated against the upper surface of the flat base of the second cup shape element 20 and has an opening 29 therethrough bounded by an internal cylindrical surface engaged against the external cylindrical surface of the second or lower body member 12 of the shock absorber and an external cylindrical surface 30, concentric with the internal cylindrical surface bounding the opening 29, engaged against an internal cylindrical surface of the upwardly extending flange 24 of the second cup shape element 20.

Upper and lower ends of an overload shock absorbing compression coil spring 31, in spaced, surrounding and concentric relation to the first or upper and second or lower body members of the shock absorber, are seated against the downwardly facing surface of the flat base of the first cup shape element 19 and the upwardly facing surface of the flat washer 26, respectively, and upper and lower end portions of said compression coil spring are housed in said first and the second cup shape element 20, respectively. As shown, said upper and lower ends of the compression coil spring are engaged against marginal circumferential surfaces of the flat base of the first cup shape element and the flat washer, respectively, in spaced, concentric relation to the external cylindrical surfaces of the first or upper and the second or lower body members 11 and 12, and external circumferential surfaces of said upper and lower end portions of said compression coil spring, housed in said first and second cup shape elements, respectively, are engaged against internal cylindrical surfaces of the downwardly and upwardly extending annular flanges of said first and second cup shaped elements, respectively.

Upper and lower clamps, each designated 32, of the overload spring mount are for the purpose of limiting the extent of possible movement of the first and second cup shape elements 19 and 20 outwardly of the first or upper and the second or lower body members 11 and 12, respectively, of the shock absorber. Each of said clamps consists of complementary frame members each including a base wall 33 and spaced, parallel interiorly extending strips 34 providing internal cylindrical surfaces 35 engageable with the external cylindrical surfaces of the first or upper and the second or lower body members 11 and 12, respectively. Headed and nutted bolts 36 in the base walls of the frame members of each clamp are for the purpose of forcing said frame members toward each other thus to cause the internal cylindrical surfaces 35 to be grasped upon the external cylindrical surfaces of said first or upper and said second or lower body members, respectively, of the shock absorber.

The clamps 32 are upon the opposite end portions of the first or upper and the second or lower body members 11 and 12, respectively, of the shock absorber, spaced apart a distance appropriate to cause the opposite ends of the overload shock absorbing compression coil spring 31 to be engaged against the flat base of the first cup shape element 19 and the flat washer 26, respectively, with said compression coil spring unsprung. The openings 21 and 23 through the bases of the cup shape elements, respectively, will be of sufficient size to permit said cup shape elements to be passed over one of the ring ends and placed upon the body members 11 and 12, respectively, thus to be assembled with the shock absorber.

The first cup shape element 19 and the downwardly extending flange 22 thereof will be retained in concentric relation to the body member 11 by reason of the fact that the internal cylindrical surface bounding the opening 21 through the flat base of said first cup shape element is in snug surrounding relation to said body member. The flat washer 26 is for retaining the second cup shaped element 20 and the upwardly extending flange 24 thereof in concentric relation to the body member 12 of the shock absorber. Said cup shape elements and said flat washer will be cooperatively operable to retain the opposite end portions of the compression coil spring, as well as the length thereof between said opposite end portions, in spaced, concentric relation to said shock absorber.

It is essential that the internal cylindrical surface bounding the opening 29 through the flat washer 26 be engaged against the external cylindrical surface of the smaller body member 12 if said flat washer is to perform its intended service. Evidently, a flat washer cannot have an opening therethrough of sufficient diameter to be passed over mounting means, such as ring ends, of diameters larger than that of a body member, such as 12, and at the same time have an internal cylindrical surface bounding the opening engaged with the body member. The washer 26 is of the type which is split, normally flat and readily deformable, as disclosed in FIGS. 5 to 9, inclusive, of the drawings. In FIG. 6 the flat washer is disclosed as when manually deformed to be placeable upon and assembled with the body member 12, and in FIG. 7 to 9 said flat washer is disclosed as when upon said body member and flattened out.

What is claimed is:

An overload spring mount to be applied to a shock absorber including relatively large and comparatively smaller cylindrical telescoping members each rigid with mounting means of diameter greater than that of said smaller telescoping member, comprising first and second cup shape elements upon and in concentric relation to the large and smaller telescoping members, respectively, each including a base wall having an opening therethrough for receiving the corresponding telescoping member, the opening through the base wall of the first cup shape element being bounded by an internal surface snugly surrounding the external cylindrical surface of said large telescoping member and the opening through the base wall of the second cup shape element being bounded by an internal surface in spaced surrounding relation to the external cylindrical surface of said smaller telescoping member, one of the telescoping members including a downwardly extending flange portion disposed exteriorly of its base wall and the other of the cup shape elements including an upwardly extending flange portion disposed exteriorly of its base wall, a shock absorbing compression coil spring upon and in spaced, surrounding relation to said first and second telescoping members, between the base walls of said first and second cup shape elements, and having opposite end portions thereof in overlying relation with surfaces of the downwardly and upwardly extending flanges, respectively, of said first and second cup shape elements, a normally flat deformable split washer within the second cup shape element in engagement with its base wall, between said base wall and an end of said compression coil spring, said washer having an opening therethrough bounded by an internal surface engaged against an external cylindrical surface of said smaller telescoping member and an external surface concentric with said internal surface engaged against an internal surface of the flange portion of said second cup shaped element, and means on said telescoping members for limiting the extent of possible movement of the first and second cup shape elements outwardly of the first and second telescoping members, respectively.

References Cited in the file of this patent
UNITED STATES PATENTS

| 1,126,321 | Walther | Jan. 26, 1915 |
| 2,874,955 | McIntyre et al. | Feb. 24, 1959 |

FOREIGN PATENTS

| 422,686 | Great Britain | Jan. 16, 1935 |
| 1,044,393 | France | June 17, 1953 |
| 743,596 | Great Britain | Jan. 18, 1956 |